United States Patent [19]
Paul et al.

[11] Patent Number: 5,332,927
[45] Date of Patent: * Jul. 26, 1994

[54] POWER SUPPLY SYSTEM FOR A TELECOMMUNICATION SYSTEM

[75] Inventors: Steven Paul, Tomah; Murray Leonard, Wisconsin Rapids; Mark Schultz; Kevin Mengelt, both of Mauston; Robert Colburn, Green Bay, all of Wis.

[73] Assignee: Best Power Technology, Inc., Necedah, Wis.

[*] Notice: The portion of the term of this patent subsequent to Mar. 30, 2010 has been disclaimed.

[21] Appl. No.: 23,367

[22] Filed: Feb. 25, 1993

Related U.S. Application Data

[63] Continuation of Ser. No. 653,793, Feb. 11, 1991, Pat. No. 5,198,698.

[51] Int. Cl.⁵ .............................................. H02J 9/00
[52] U.S. Cl. ..................................... 307/66; 320/62; 322/11; 307/64
[58] Field of Search ............... 307/46, 47, 48, 64, 307/66, 67, 68, 86; 322/10, 11; 320/62

[56] References Cited

U.S. PATENT DOCUMENTS

| | | | |
|---|---|---|---|
| 1,951,482 | 3/1934 | Holden | 307/64 |
| 2,302,192 | 11/1942 | Dannheiser | 307/64 |
| 3,514,625 | 5/1970 | Lane | 307/67 |
| 3,665,495 | 5/1972 | Carter et al. | 307/67 |
| 3,714,452 | 1/1973 | Williamson | 307/86 |
| 3,866,059 | 2/1975 | Przywozny | 307/10.1 |
| 4,096,394 | 6/1978 | Ullmann et al. | 307/46 |
| 4,315,163 | 2/1982 | Bienville | 307/66 |
| 4,672,296 | 6/1987 | Griffin | 307/10.1 |
| 4,686,379 | 8/1987 | Ohnari | 307/66 |
| 4,857,755 | 8/1989 | Comstock | 307/68 |
| 5,198,698 | 3/1993 | Paul et al. | 307/64 |

OTHER PUBLICATIONS

Miller Electric Mfg. Co. advertising brochure for Trailblazer 250G-250 Ampere MultiProcess Gasoline Engine Driven Welding Generator, Aug. 1989.
Miller Electric Mfg. Co. advertising brochure for Big 30A Diesel-300 Ampere Diesel Engine Driven Welding Generator, May 1990.
Miller Electric Mfg. Co. advertising brochure for Big 40G-400 Ampere Gasoline Engine Driven Welding Generator, Dec. 1989.
Miller Electric Mfg. Co. Owner's Manual for Model: Blue Charger, Form OM-429A, Sep. 1990.
Miller Electric Mfg. Co. Owner's Manual for Model: Big 40 Diesel, Form OM-474G, Apr. 1991.
Miller Electric Mfg. Co. advertising brochure for ARC Welding Equipment, Nov. 1989.

*Primary Examiner*—Jeffrey A. Gaffin
*Attorney, Agent, or Firm*—Foley & Lardner

[57] ABSTRACT

An auxiliary power supply system includes an internal combustion engine driving an alternator the output of which is rectified and supplied to DC bus lines across which a storage battery is connected. The DC bus lines may supply a consuming device such as an uninterruptible power supply or telecommunications system. The voltage across the bus lines is sensed and when the voltage drops below a selected value, indicating that the consuming devices is drawing power from the battery beyond a desired limit, the engine is turned on for a period of time to warm it up, during which the power from the generator is not supplied to the DC bus lines. Thereafter, the generator supplies power to the DC bus lines to supply the consuming device and partially recharge the battery until the consuming device is no longer drawing power, after which the engine is shut off. The power supply system includes a controller which monitors the intervals of time between turn-ons of the engine and if a selected period of time is exceeded, the engine is started without supplying power from the generator to the DC bus lines to allow the engine and generator to warm-up, enhancing maintenance of the system. The operating characteristics of the engine and generator are sensed and stored for access by an operator and warnings are provided if these conditions exceed acceptable limits.

9 Claims, 6 Drawing Sheets

POWER SUPPLY SYSTEM FOR A TELECOMMUNICATION SYSTEM

This is a continuation of Ser. No. 07/653,793 filed Feb. 11, 1991, entitled Auxiliary Power Supply System for Providing DC Power on Command, now U.S. Pat. No. 5,198,698.

FIELD OF THE INVENTION

This invention pertains to power supply units suited to provide backup electrical power in the case of failure of the primary power from a source such as the commercial power grid.

BACKGROUND OF THE INVENTION

Uninterruptible power supplies or systems (UPS) are coming into common use to backup the power supplied from the commercial power system to critical loads such as computers, telephone systems or medical equipment. In case of a black-out or disturbance on the commercial power system, the UPS takes over the supply of power to the critical load during the interruption. Although various designs are used for UPS systems, they typically provide power during black-outs from a storage battery through an inverter to the critical load during the time that the power system is down.

Because most UPS systems utilize a battery to provide the stored energy to power the critical load during black-outs, the run time for UPS operation is limited by the storage capacity of the battery. Thus, the most straightforward present way of extending the UPS run time is simply to use additional batteries. However, this approach has several difficulties. One is cost, since the number of batteries required is generally proportional to the desired run time. Moreover, increasing the number of batteries presents additional problems. Battery connections must be kept tightened and free of corrosion, which increases the maintenance cost. To achieve optimum battery life, the batteries must be maintained fully charged and at the proper temperature. Battery storage rooms often require special ventilation. Multiple strings of batteries often become unbalanced as they age. Large number of batteries also occupy valuable floor space and their weight may cause structural loading problems. Furthermore, batteries commonly require replacement in three to five years, which may be substantially less than the life time of the UPS system as a whole, thus increasing the cost of the system over its lifetime.

An alternative to the use of additional batteries to provide auxiliary power to a critical load during long blackouts has been the use of a gasoline fueled alternating current (AC) generator (alternator). AC generators have traditionally been used to provide backup power to critical loads, including entire buildings, during long power outages in the commercial power system. To avoid even a momentary interruption of power to critical loads, a UPS may be used to supply the critical loads for a short period of time, after which the gasoline engine of the AC generator is started, allowing the generator to take over the supply of power to the load. This may be accomplished by disconnecting the UPS from the load and directly connecting the AC generator to the load during prolonged power outages. In some UPS systems, the AC generator is switched in to the input terminals of the UPS to substitute for the failed line power during prolonged power outages. Such a connection of the AC generator is most typically utilized in double inverter UPS systems in which the critical load is constantly supplied with power from the UPS inverter even during normal operation.

The utilization of an auxiliary gasoline engine driven AC generator to provide the backup supply power is useful but has certain disadvantages. Commonly, the gasoline engines which power the generator will not start when needed. The unreliability of the gasoline engine is particularly a problem where the generator is at a remote location where frequent preventive maintenance is not possible or convenient. Because such standby generators are only occasionally started to supply power to the load during power outages, the condition of both the engines and generators can deteriorate. For example, engines which run only infrequently may be subject to corrosion problems caused by condensation, lack of lubrication on bearing surfaces, and other problems associated with long term idleness.

If AC generators are utilized to provide power to a conventional double conversion UPS, the generators must typically be oversized by a factor of 2.5 to 3 times. Such oversizing is required because of the high crest factor load created by the double conversion of the AC power to DC power back to AC power. For example, a 10 kilowatt (KW) UPS generally will require a 25–30 KW AC generator. Additional costs are incurred for the installation and the cost of an automatic transfer switch.

If the critical loads are to be switched from the UPS to the AC generator, once it is up and running, the generator must be phase locked and synchronized with the output of the UPS so as to maintain a smooth transition. This transition is often difficult unless sophisticated and costly electronics are utilized. Such electronics adds to the cost and complexity of the system, but a poor power transition can disrupt the flow of power to a particularly critical load, such as a computer, and cause it to malfunction.

A problem associated with the use of AC generators connected directly to the load is that the AC generator output is often unstable, which results in additional system problems. To stabilize the frequency of the output, the engine/generator set is often oversized. Mechanical or electronic speed governor systems are required, which add cost and complexity to the system and reduce reliability. If the load on the AC generator changes in magnitude or phase angle, the output waveform from the generator is often distorted. These distortions can affect the operation of the more sophisticated UPS models, which examine sags in their input waveform to anticipate outages and serious under-voltages. Such cyclic load-induced variations in generator waveforms can cause such UPS systems to revert to battery operation frequently, even when battery power is not actually necessary to support the load. The result is battery depletion and reduced backup capabilities.

AC engine/generator sets have also been utilized as auxiliary power supplies for other applications where a UPS is not necessary, for example, in telephone systems where the batteries which provide power to the telephone networks are charged with rectified power from the AC power lines. Auxiliary engine/generator sets may be utilized to provide the charging power to these batteries during power system failure. However, such engine/generator sets have been subject to the same types of reliability and maintenance problems discussed above.

SUMMARY OF THE INVENTION

In accordance with the present invention, an auxiliary power supply system is provided which provides DC output power on demand to DC bus lines such as those across which a battery is connected which supply power to an uninterruptible power system, a telecommunication system, or other comparable DC load. The auxiliary power supply of the present invention includes an internal combustion engine connected to drive an alternator which preferably provides polyphase output power to a rectifier which converts the AC power to DC power. Filters are preferably used to filter the rectified DC power to provide a low ripple output voltage to the DC bus lines.

The auxiliary power supply of the present invention is advantageously utilized with a UPS system which provides power to a critical load during momentary interruptions of power from the commercial power system. In such applications, the commercial power system would typically provide AC power to the critical load during normal operation and would, either through a separate rectifier or though the UPS system, provide charging power to the storage battery to maintain the charge condition of the battery. During such normal operation, the auxiliary power system is not operating. Upon a power outage, the UPS system operates in the usual manner to supply continuous AC power to the load without interruption. The controller of the auxiliary power system of the present invention monitors the operation of the UPS and the DC voltage at the UPS battery and determines whether a long-term power outage has occurred and whether the battery supplying the UPS has sufficient reserve energy to supply power to the load. Upon determination that auxiliary power will be needed to augment the battery power supplied to the UPS, the engine of the auxiliary power system is started. For an initial warm-up interval, no power is supplied from the AC generator to the load. Upon adequate warm-up of the engine, the rectified output of the alternator is connected to the DC bus lines both to provide power to the UPS which is transferred to the critical load and to recharge at least partially the storage battery. Because the auxiliary power generator provides its output power to the DC bus lines to which the storage battery is connected, there is no change in the output provided from the UPS during the switching-in of power from the auxiliary power system, and thus no disruption or disturbance in the AC power supplied to the critical load.

It is a particular objective of the present invention to provide an auxiliary power system having a high reliability engine/generator set by appropriate exercising of the auxiliary power system and by monitoring of system conditions during the time that the system is being exercised and during actual power supply operation. A computer controller within the auxiliary power system monitors the time elapsed since the last turn-on of the system, which may have occurred during an exercise operation or during actual power supply operation. If the time elapsed exceeds a predetermined interval, the controller starts the engine to run the engine and generator set with power disconnected from the DC bus lines. The engine is run for a time sufficient to properly exercise the engine and maintain adequate lubrication and condition of moving parts in both the engine and the generator. The length of time of running of the engine may be predetermined to achieve a desired system operating condition such as engine temperature. During the time that the engine is operating, the controller preferably monitors several conditions of the engine and generator, including the date and time of the exercise cycle, the DC output voltage from the generator, the remaining fuel level in the fuel tank of the engine, the battery voltage of the cranking battery that provides the cranking power to turn on the engine, the engine block temperature, oil pressure, and the ambient temperature, and may also monitor conditions of the DC bus line, such as the voltage across the DC bus lines and thereby the condition of the main storage battery supplying the UPS or the DC load. During exercise engine operation, the controller stores the values of the system conditions that were monitored in non-volatile memory and makes such values available for read-out, either by an operator at the site of the auxiliary power system or through telemetry to a remote location. Moreover, the controller preferably compares the monitored system conditions with predetermined set point conditions and provides an error or warning signal if the sensed conditions are outside of the boundaries specified by the set points. This warning may be provided through an audible or visual signal (or both) provided to the operator at the site or remotely by telemetry. The sensing of system condition values which would indicate a serious malfunction of the system, such as over-temperature of the engine, or very low fuel level, or deficient generator output voltage, will result in the controller shutting down the auxiliary power system and disconnecting it from the DC bus lines so that no damage is done either to the auxiliary power system or to the components connected to the DC bus lines. Such monitoring and control of the auxiliary power system operation is carried out both during the exercise cycling of the engine and during power supply operation where power is being provided to the DC bus lines.

The auxiliary power system of the invention preferably monitors the voltage across the DC bus lines to determine if and when the engine should be started to prepare to provide power to the bus lines. During normal operation when the commercial power grid is supplying power to the load and to the UPS to charge the battery, the voltage across the DC bus lines will be constant at a nominal value. Upon failure of line power, the UPS automatically switches in to supply power from the battery to the load. This results in a decline in the voltage across the bus lines as the battery is drained, generally in exponential decaying manner. If the power outage is relatively short, the auxiliary power system need not be activated. When supply of power from the commercial power system is resumed, the UPS will stop discharging the battery and power can be provided from the commercial power system to the battery to recharge it. Relatively short power outages do not damage the battery and allow it to be readily recharged to prepare for another power shortage. However, if the voltage across the DC bus lines drops below a predetermined value, indicating either that the power outage is of a long duration or that the load on the battery through the UPS is sufficiently great that the battery is being rapidly drained, the system controller starts the engine of the auxiliary power system. However, the rectified output voltage of the alternator is not immediately applied to the DC bus lines. Rather, the engine is allowed to warm-up for a preset period of time so that when the output of the alternator is connected to the DC bus lines the engine will be operating at normal conditions and the alternator will be running at proper speeds so that the loading on the engine as the alternator output is switched-in to the DC bus lines will not adversely affect the operation of the engine or the alternator. When the output of the auxiliary power system is connected to the DC bus lines, the voltage provided by the auxiliary power system is greater than the voltage level provided from the battery at that time, but not at the level of the fully charged battery voltage under normal conditions. At such output voltage levels from the auxiliary power system, the power through the UPS to the load will be provided entirely from the auxiliary power system, and, in addition, the battery will be partially recharged with power from the auxiliary system. The controller monitors the output of the voltage across the DC bus lines and controls the output of the generator to maintain this voltage. Consequently, the auxiliary power supply cannot overcharge the storage batteries. The auxiliary power system continues to provide power to the UPS (or other DC load) for as long as necessary. When commercial line power returns, commercial power is provided to the critical load and the controller senses the drop in the demand for load current on the DC bus lines and turns itself off. The battery charger within the UPS or an auxiliary battery charger then provides DC power from the commercial power system to the DC bus lines to bring the storage batteries back to full charge. Consequently, the auxiliary power system of the present invention serves to maintain the storage batteries at optimum charge without overcharging, and without the loss of water or electrolyte which would accompany overcharging or excessive draining of the battery. The output of the auxiliary power system is preferably voltage regulated and current limited to protect the batteries and other equipment connected to the DC bus lines. Output fuses prevent damage from accidentally reversed connections to the external batteries.

The alternator utilized in the auxiliary power system is preferably a high frequency (greater than 60 HZ) polyphase brushless alternator providing its output to a rectifier and filter system to provide extremely smooth DC voltage to the DC bus lines. The smooth DC output voltage reduces the RMS magnitude of charging current to the batteries, and by precision voltage regulation across the DC bus lines, the batteries are floated at the correct potential for optimum life of the batteries.

Further objects, features and advantages of the invention will be apparent from the following detailed description when taken in conjunction with the accompanying drawings.

DETAILED DESCRIPTION OF THE INVENTION

Figure 1:
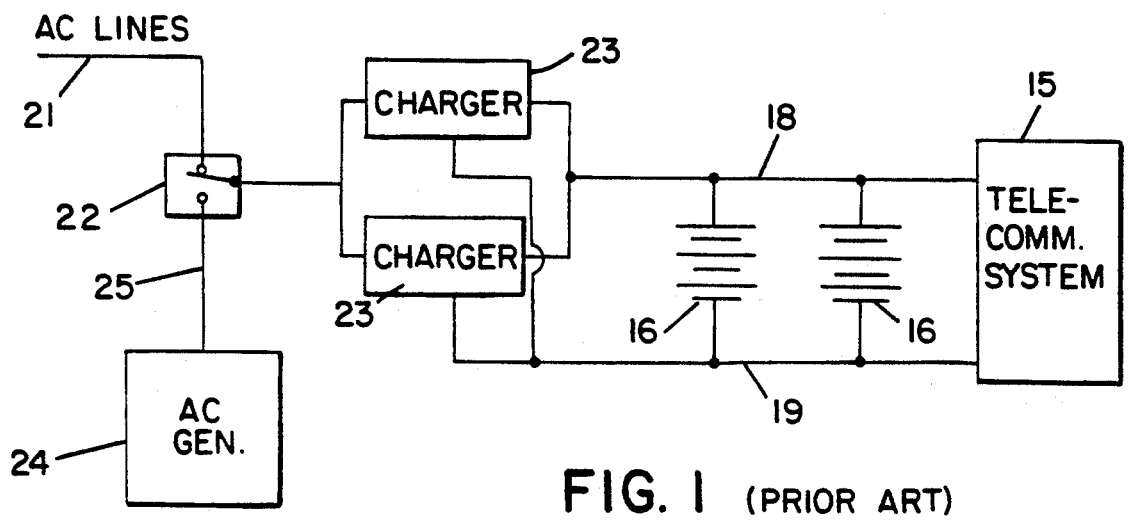
FIG. 1 is a block diagram showing a typical configuration in which AC generator sets have been used to provide auxiliary power to DC consuming equipment such as telecommunication systems.
Figure 2:
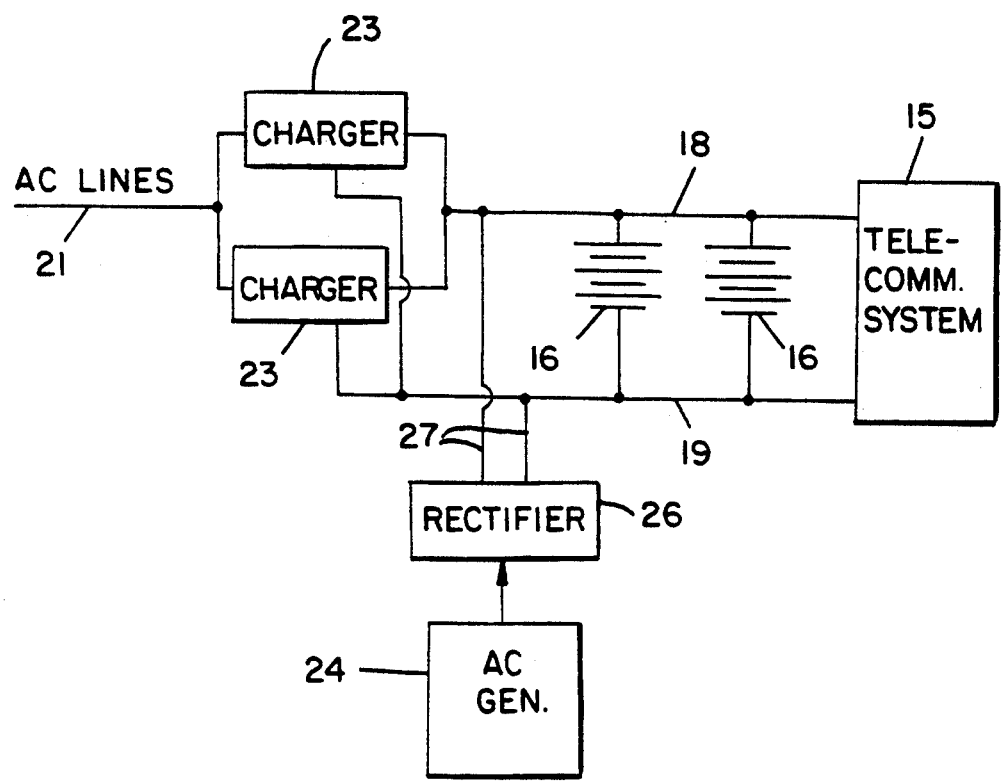
FIG. 2 is a block diagram showing a typical configuration in which AC generator sets have been used to provide auxiliary power to DC consuming equipment such as telecommunications systems.

To best illustrate the utilization of the auxiliary power supply of the present invention, conventional connections of AC generators to DC consuming loads are illustratively shown in block diagram form in FIGS. 1-4. FIG. 1 shows a connection to a telecommunication system 15 which receives power from multiple batteries 16 connected between DC power lines 18 and 19. The batteries 16 are charged normally from power provided from AC lines 21 through a transfer switch 22 to redundant chargers 23 the DC output of which is connected to the lines 18 and 19 to charge the batteries 16. Upon failure of the power from the AC power lines 21, the transfer switch 22 is switched to provide power from an AC engine/generator set 24 through AC power lines 25 and the switch 22 to the chargers 23. The generator 24 is run as long as necessary to maintain the charge on the batteries 16. A variation of this arrangement is shown in FIG. 2 in which the components are the same except that the output of the AC generator 24 is provided to a separate rectifier 26, the DC output of which is connected by lines 27 to the DC bus lines 18 and 19. The AC generator can then supply power to the DC bus lines in parallel with the AC lines, although ordinarily the generator would not be run as long as power is available from the AC power lines. Typical DC loads 15 are telecommunications systems, such as telephone systems, which use a relatively low DC voltage for operation.

Figure 3:
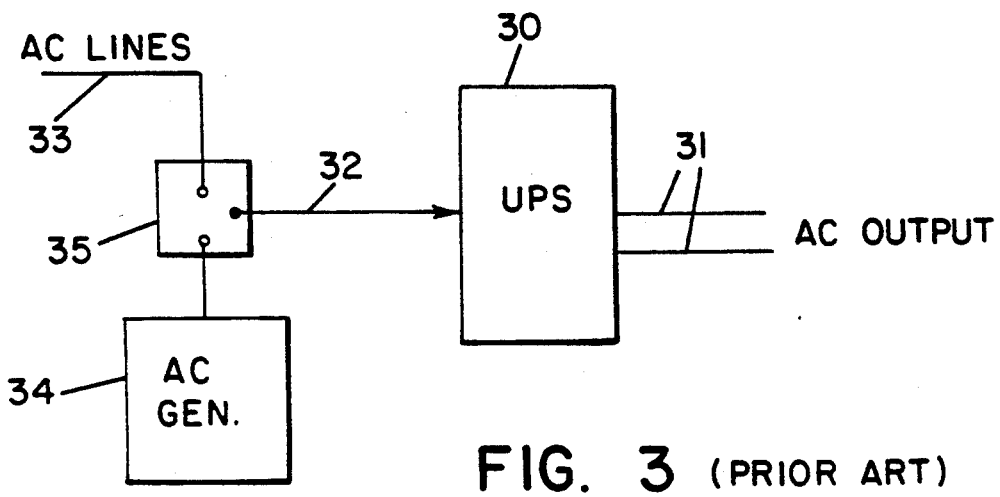
FIG. 3 is a block diagram showing a typical configuration in which AC generator sets have been used to provide auxiliary power to DC consuming equipment such as uninterruptible power supplies.
Figure 4:
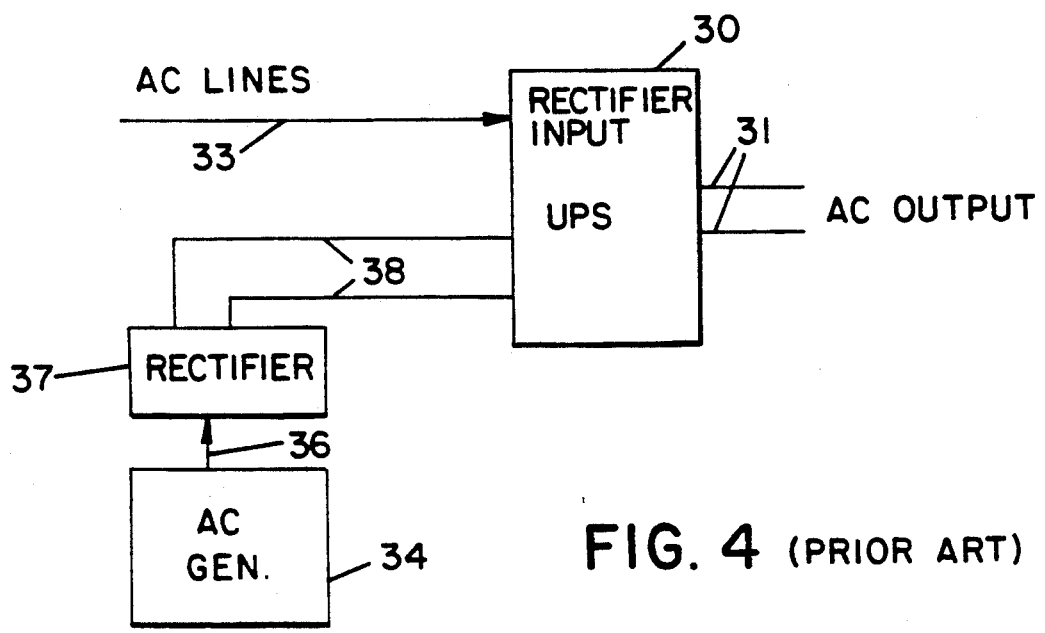
FIG. 4 is a block diagram showing a typical configuration in which AC generator sets have been used to provide auxiliary power to DC consuming equipment such as uninterruptible power supplies.

Most power consuming devices are adapted to operate on alternating current such as that conventionally provided by commercial power systems. To maintain continuity of power supplied to such loads, uninterruptible power systems have been developed which automatically provide an AC output voltage to the critical load when power in the power system fails, generally with a minimum disruption in the waveform of the voltage provided to the critical load. Typical prior arrangements in which an AC engine/generator set are connected to an uninterruptible power system (UPS) are illustrated in FIGS. 3 and 4. As shown in FIG. 3, the UPS 30 which provides AC output on lines 31 receives AC input power on a line 32 either from the AC power lines 33 or an AC generator 34, depending on the position of a transfer switch 35. Under normal operation, the AC generator 34 is not operating and normal power is provided from the line 33 through the switch 35.

Upon power system failure, the UPS 30, which contains an internal storage battery (not shown), immediately provides AC output power which is supplied from the internal battery. The AC generator 34 is then turned on and power is supplied from the generator through the transfer switch 35 to the AC input lines 32 to the UPS. The UPS has an internal rectifier which rectifies the AC voltage on lines 32 to a DC voltage which is inverted to the AC output, although some UPS systems have been built to operate so that the AC input power is directly connected to the AC output lines 31. A common type of UPS system called a double conversion system converts the AC input power on lines 32 to a DC voltage which is applied in parallel to the storage battery voltage, and the DC power is then inverted to an AC output power so that the output inverter operates continuously, even during normal power conditions on the AC output line. Other types of uninterruptible power supply systems do not have a constantly running inverter to invert the DC input power to AC output power, but turn on the inverter only when power from the AC input lines fails.

A variation on the UPS architecture commonly used in the prior art is shown in FIG. 4. In this arrangement, the AC input lines 33 are directly connected to the normal AC input connection of the UPS where, for example, in a double conversion system the internal rectifier of the UPS would rectify this voltage to DC voltage which is applied across the battery of the UPS. However, the output power on lines 36 provided by the AC generator 34 is rectified by a rectifier 37 to a DC voltage which is provided on DC output lines 38 to the UPS 30. This DC output voltage from the rectifier 37 would then be applied in parallel with the DC voltage of the internal storage battery within the UPS 30.

In each of the foregoing systems, the AC engine/generator 24 or 34 is a conventional generator set which provides alternating current output power when needed but is not constantly running. Due to the long periods of idleness between the times at which the generator is called upon to supply power, deterioration of the generator sets can occur for the reasons described above, leading to reliability problems and the need for excessive maintenance and monitoring of these systems. If the generators are intended to provide alternating current directly to the output lines, such generators must be designed (for typical operation in the United States) to provide 60 HZ output power at desired output voltages (e.g., 120 V or 240 V), requiring provision for careful control of output voltage, frequency and phase. Such requirements constrain not only the generator but also the operation of the engine, and often require oversizing of the engine and generator to meet these requirements.

In contrast, the auxiliary power system of the present invention is specifically designed to provide DC output power at a controlled voltage level, utilizing rectification of the output of a generator, so that it is not necessary to control the output frequency or phase of the alternator but rather only the effective DC voltage level delivered from the rectified output of the alternator. Consequently, the control of the alternator is simplified and the size of the alternator and engine driving it can be more appropriately sized to the maximum power output required from the engine/generator set. The auxiliary power system of the present invention effectively acts as a regulated DC power source providing a controllable DC output voltage under varying load conditions.

Figure 5:
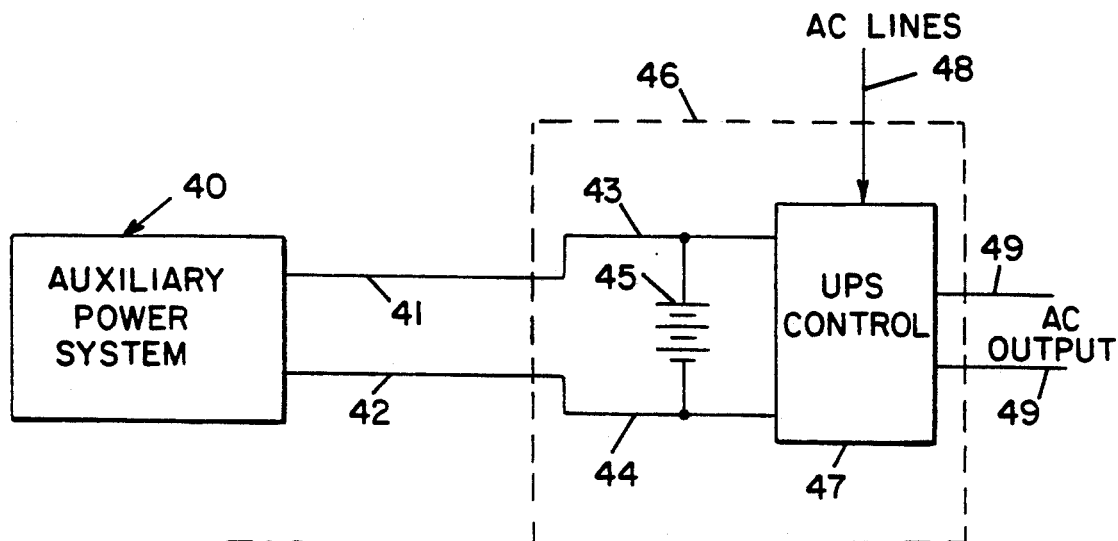
FIG. 5 is a block diagram showing a connection of the auxiliary power system of the present invention to an uninterruptible power supply system.
Figure 6:
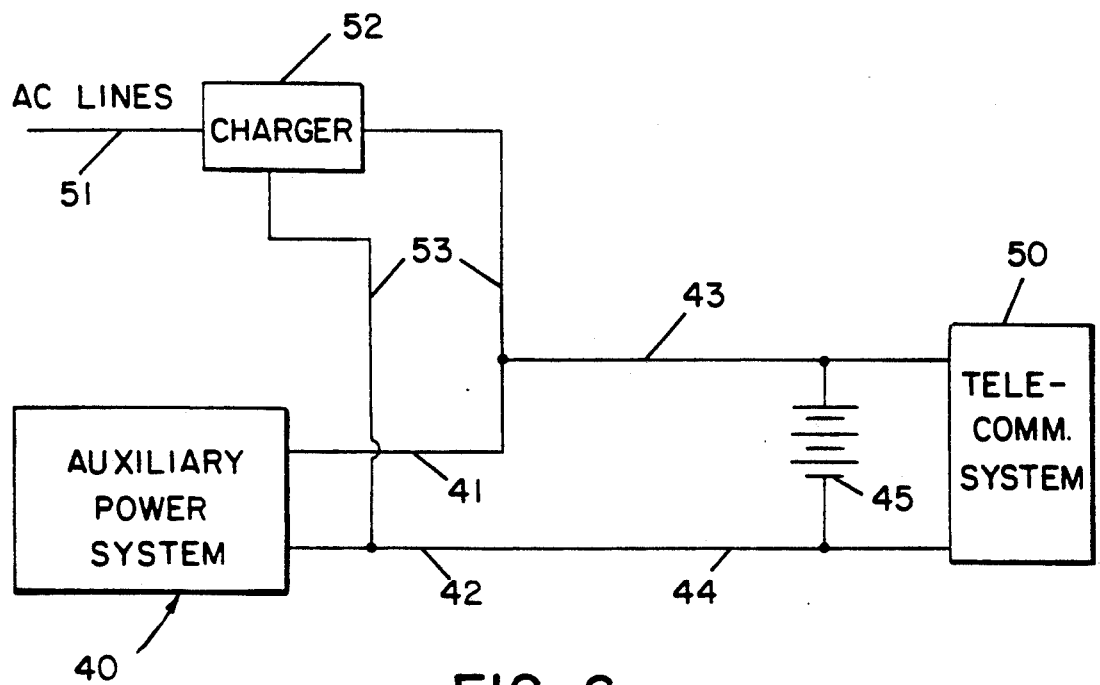
FIG. 6 is a block diagram illustrating the connection of the auxiliary power system of the present invention to a telecommunications system.

Typical connections of the auxiliary power system of the present invention are shown in block diagram form in FIGS. 5 and 6. With reference to FIG. 5, the auxiliary power system 40 of the invention provides output DC power, when activated, on DC output lines 41 and 42 which are connected to DC bus lines 43 and 44. A battery or batteries 45 are connected across the DC bus lines 43 and 44. The battery 45 may form the internal battery of an uninterruptible power supply system 46 which also includes rectifier, inverter and control components represented collectively by the block 47 in FIG. 5. These components receive AC input power on lines 48 from the commercial AC power system and deliver AC output power on output lines 49 to the critical load. The UPS 46 may be any type of UPS architecture, including a double conversion UPS system in which the AC input power 48 is rectified to a DC voltage level applied in parallel to the bus lines 43 and 44 and then constantly inverted to an AC power on the lines 49, or a system in which in the AC power on the lines 48 is transferred to the output lines 49 without being converted to DC power under normal conditions, for example, by using a ferroresonant transformer between the input and output. The UPS system may also be of the type which directly connects the input power on the lines 48 to the AC output lines 49 during normal operation, but provides inverted power to the lines 49 from the DC bus lines 43 and 44 during power outages on AC power lines 48. With each of these types of systems, the auxiliary power system 40 does not normally provide DC power on the lines 41 and 42 as long as proper AC power is provided from the lines 48. When extended power outages occur on the lines 48, the system 40, as described further below, determines when an extended power outage has occurred or when the battery 45 cannot meet the demands of the load, and turns on to provide the DC power in the lines 41 and 42 to take over the supply of power to the UPS and thus supply power to the load.

The system of FIG. 6 utilizes the auxiliary power supply 40 with a constant DC load, such as a telecommunication system 50, which normally receives power from the DC bus lines 43 and 44 across which the battery 45 is connected. When AC power is available from an AC power system on power lines 51, a charger 52 is operated to supply power on DC lines 53 to the bus lines 43 and 44 to maintain a charge on the battery 45 and supply power to the load 50. Upon failure of the AC power system, the auxiliary power system 40 is turned on to perform the duty of supplying charging power to the battery 45 and to the load 50.

Figure 7:
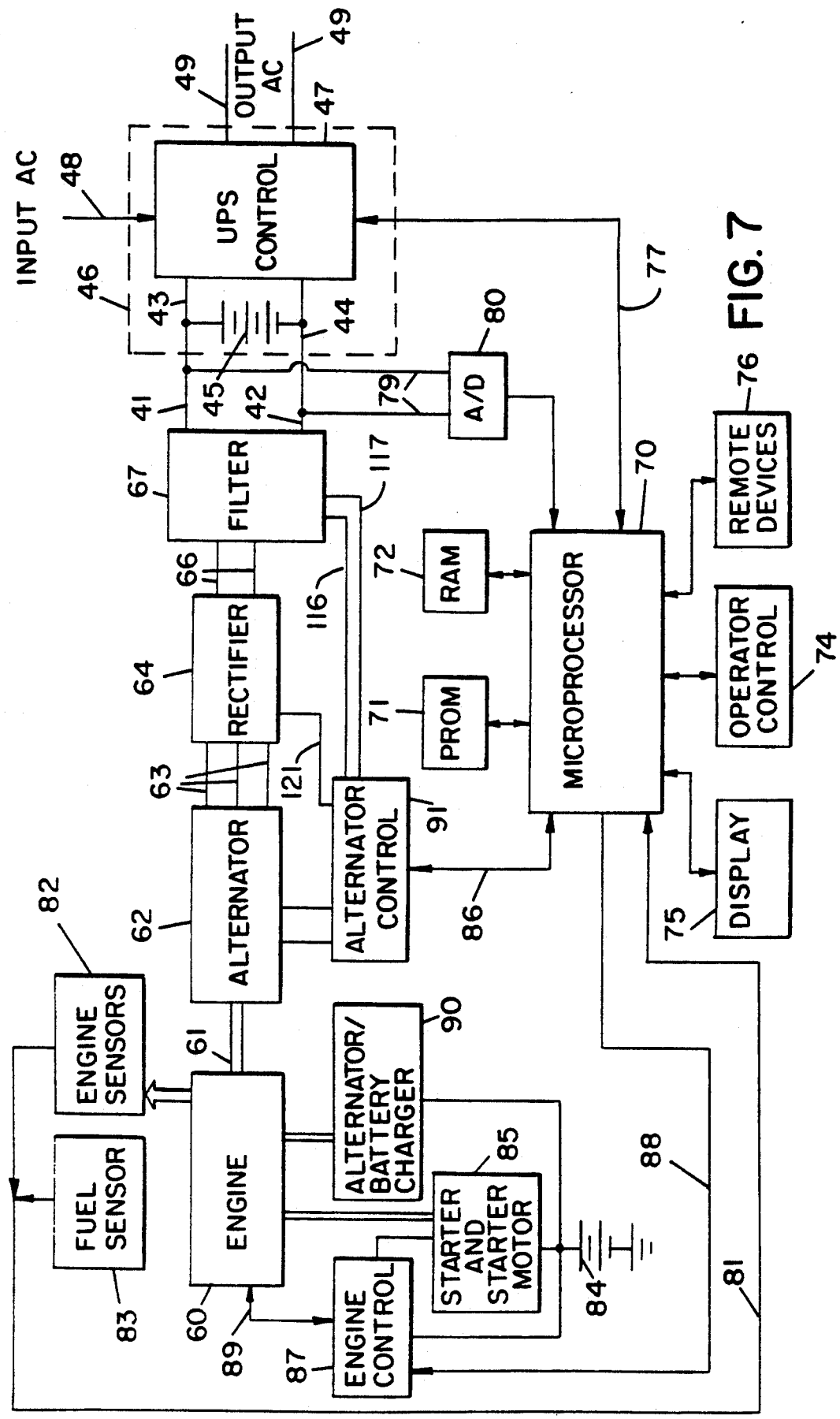
FIG. 7 is a block diagram of the major components of the auxiliary power system of the present invention.

A block diagram of the auxiliary power supply system 40 of the present invention shown illustratively connected to an uninterruptible power system (such as the UPS 46 of FIG. 5) is shown in FIG. 7. Power is provided from an internal combustion engine 60 coupled by a shaft 61 to an alternator 62. The alternator 62 preferably provides polyphase (e.g., three phase) output power on power lines 63 which are connected to a bridge rectifier 64. A higher number of phases (e.g., 9 phase) may also be utilized, particularly where higher power output is required. The rectifier 64 rectifies the alternating current from the alternator and provides DC output voltage on output lines 66 to a filter 67 which filters out the ripples in the rectified output voltage to provide a relatively constant output voltage on the output lines 41 and 42 which are connected to the DC bus lines 43 and 44.

The monitoring and control of the auxiliary power supply is carried out by a microprocessor 70 with associated read only memory (PROM) 71 and random access memory (RAM) 72 under control of internal program in the PROM 71. The microprocessor receives operator input from an operator control panel 74, provides display of operating conditions and various parameters on a visual display 75 which can be read by the operator, and communicates with remote devices 76 such as remote terminals connected by a telephone line or other telecommunications connection.

The microprocessor 70 operating under the control of its internal program monitors the state and operating parameters of the system. In particular, the microprocessor monitors the voltage across the output lines 41 and 42 and the DC bus lines 43 and 44 by lines 79 which are connected to an analog-to-digital converter 80 which provides its digital output data indicative of the voltage across the DC bus to the microprocessor 70. The microprocessor also receives readings on data lines 81 from engine status sensors 82, such as oil pressure and engine block temperature sensors, from sensors which indicate the level of remaining fuel in the fuel tank 83, and from a sensor which indicates the voltage on the starter battery 84 which provides power to the starter motor 85 which is used to start the engine 60. The microprocessor 70 further provides control signals on output lines 88 to an engine control system 87 which provides output signals on lines 89 to start the engine 60 by supplying power from the battery 84 to the starter motor 85, and to control the speed of the engine. Electrical power for running the engine and recharging the battery 84 may be provided from a small alternator charger 90 driven by the engine. The microprocessor may also provide output control signals on a line 86 to an alternator controller 91 which supplies current to the field winding of the alternator 62 to control the output voltage provided from the alternator and thereby regulate the output voltage on the output lines 41 and 42. Alternatively, the output voltage on the lines 41 and 42 (or on the bus lines 43 and 44) may be fed back directly to the alternator and compared with a reference in a conventional fashion in the controller 91.

The engine 60, which acts as the prime mover in the power supply system, is preferably sized to support the shaft load required by the alternator system. Although the engine 60 may typically be a gasoline powered engine (e.g., an ONAN Gas Electric Model P218), the engine may be adapted to use other fuels, such as liquid petroleum, diesel, kerosene, natural gas, and so forth. The engine is preferably of standard design utilizing automatic choking and fuel management devices to allow unattended operation, and the construction and operation of such engines is well known in the art. The engine is selected to provide adequate shaft torque to produce prescribed output power over a relatively wide speed range.

The alternator is coupled to the output of the engine either directly or through belt drive to provide torque conversion. The alternator is preferably polyphase, having a rotary field winding with a minimal current commutator and which is adapted to drive low voltage, high current DC loads such as, for example, alternators adapted for DC electric arc welders, available from Miller Electric Manufacturing Company and other manufacturers. The armature winding or output winding is stationary, with no brushes required in the output. The armature winding is preferably a high frequency (e.g., approximately 100 Hz) polyphase winding (typically three phase), selected to produce high quality DC after rectification. If desired, a separate low frequency (50 or 60 Hz) single phase winding may be added to supply alternating current power to accessories. The output voltage of the armature winding is controlled by the current supplied to the rotating field winding through a slip ring commutator. The control of the alternator field winding may be by a conventional feedback controller 91, such as those used in arc welding power supplies, or under the control of the microprocessor 70 which monitors the DC bus voltage on the DC bus lines 43 and 44 and provides appropriate feedback control signals to the field winding to maintain the desired output voltage.

The battery or batteries 45 will be selected based on a particular application. For example, the main battery 45 may be a multiple celled series or series-parallel connection of individual batteries, which are connected together to produce the desired voltage and ampere-hour requirements of the load. For a given telecommunication or other DC power load installation, the provision of the auxiliary power supply 40 allows the battery 45 to be sized smaller than would otherwise be required to adequately handle the power requirements of the system. For UPS operation, the battery may be sized to carry the critical load through short term outages, with the auxiliary power system 40 supplying power during prolonged outages.

The rectifier 64 comprises polyphase solid-state rectifiers which convert the alternator output voltage to direct current. The filters 76 may be formed in a conventional manner of L-C elements to remove the high frequency ripple to provide a clean, low-ripple direct current on the output lines 41 and 42 to the DC bus lines 43 and 44. Additional filters may be connected to control electromagnetic interference.

The voltage sensing on the output lines 41 and 42 (or the DC bus lines 43 and 44 to which the output lines are connected) may be done both internally or externally. Internal sensing provides feedback to the alternator voltage regulator circuitry from the output terminals to maintain the output voltage regulated to a reference. External sensing provides feedback to the alternator voltage regulator from either the battery terminals—maintaining a precise voltage at the battery—or from the input terminals at the connected load. The latter connection maintains the potential at the load end of the cables. By utilizing external sensing, compensation is automatically provided for voltage drops in the cable connectors, thereby maintaining the prescribed voltage at the load points at which the voltage sensors are located. Preferably, the user can select the point at which voltage sensing is accomplished. When external sensing is used, the generator output voltage is automatically adjusted so that a predetermined regulated voltage appears at the battery terminals, thereby compensating for the voltage drop in the connecting cables 41 and 42 between the auxiliary power system 40 and the batteries. Where a telecommunication system is the load, the sense lines can be connected at the input terminals of the load, thereby automatically correcting for the voltage drop in the cables from the battery bank to the load if long cables are required between the battery bank and the load.

The microprocessor 70 also preferably monitors the auxiliary power supply output voltage and load current. If the output voltage becomes excessive, an alarm is sounded which can be detected by the operator, and a further increase of output voltage to a trigger level (e.g., 62 volts for a full charge battery voltage of 56 volts) causes the microprocessor to shut the system down, thereby protecting the batteries 45 from damage. The microprocessor may also monitor the load current and limits the load current to a safe value. Fuses are provided between the power system 40 and the output lines 41 and 42 to further provide protection for current overloads. The battery 45 voltage is also preferably monitored and the engine operation is controlled appropriately. When the power system of the invention is connected to a bank of telecommunication supply batteries, during charging an alarm will be triggered followed by turn-off when the temperature compensated voltage reaches the prescribed level. At this point, the power provided from the auxiliary power system 40 is not required, and the engine is shut-off. For UPS applications, the load current is sensed and when the load current decreases to a small value (a default setting, such as 10 amperes or less) the system may interpret this as an inverter shut-down, indicating that commercial line power has returned, and thereafter the engine will automatically be shut down.

The controller includes the microprocessor 70 (e.g., an NEC 7810 8 bit microprocessor) with ancillary firmware in the PROM 71 and conventional control circuitry. Preset values for various engine and operating parameters are set to default values in the PROM, with these preset values determining the operation of the system. Although many parameters and calibration constants can be preprogrammed, preferably these can also be reprogrammed in the field but with parameters and constants maintained secure by utilizing password control.

The display 75 may be a high visibility display, for example, of the vacuum fluorescent type, which provides the operator with significant information concerning the operation of the system, such as output voltages, currents, operating times, default values, and a functional log indicating the current state of the system and the history of the state of the system.

The microprocessor can communicate with the UPS 47 through an RS232 port on lines 77, and may communicate with external remote terminals via the RS232 port or an RS485 interface to the remote devices 76.

The present invention provides an auxiliary power system having a high reliability engine/generator set by appropriate exercising of the auxiliary power system and by monitoring of system conditions during the time that the system is being exercised and during actual power supply operation. The computer controller 70 within the auxiliary power system monitors the time elapsed since the last turn-on of the engine 60, which may have occurred during an exercise operation or during actual power supply operation. If the time elapsed exceeds a predetermined interval, the microprocessor controller 70 starts the engine 60 by providing a signal on the lines 88 to the engine control 87 to run the engine 60 and generator 62 set with power disconnected from the DC lines 41 and 42 and the bus lines 43 and 44. The engine is run for a time sufficient to properly exercise the engine 60 and maintain adequate lubrication and conditioning of moving parts in both the engine 60 and the generator 62. The length of time of running of the engine 60 may be predetermined to achieve a desired system operating condition such as engine temperature. During the time that the engine is operating, the microprocessor controller 70 preferably monitors several conditions of the engine 60 and generator 62, including the date and time of the exercise cycle, the DC output voltage from the generator 62, the remaining fuel level in the fuel tank of the engine from the fuel sensor 83, the battery voltage of the cranking battery 84 that provides the cranking power to turn on the engine and the engine block temperature, oil pressure, and the ambient temperature, and the microprocessor controller 70 may also monitor conditions of the DC bus line, such as the voltage across the DC bus lines 43 and 44, and thereby the condition of the main storage battery 45 supplying the UPS 47 or a DC load (not shown in FIG. 7). During exercise engine operation, the controller 70 stores the values of the system conditions that were monitored in non-volatile memory such as the PROM 71 and makes such values available for read-out, either by an operator at the site of the auxiliary power system on the display 75, or through telemetry to a remote location at remote devices 76. Moreover, the controller 70 preferably compares the monitored system conditions with predetermined set point conditions and provides an error or warning signal if the sensed conditions are outside of the boundaries specified by the set points, for example, by monitoring the DC voltage output of the rectifier 64 and the filter 67, provided on lines 116 and 117 to the alternator control 91 and on the lines 86 to the microprocessor controller 70, while the engine 60 is running, and providing a warning signal to the operator if the output voltage is above or below predetermined limits. This warning may be provided through an audible or visual signal (or both) provided to the operator at the site via the display 75 or remotely by telemetry to the remote devices 76. The sensing of system condition values which would indicate a serious malfunction of the system, such as over-temperature of the engine 60, or very low fuel level, or deficient generator output voltage, will result in the controller 70 shutting down the auxiliary power system and disconnecting it from the DC lines 41 and 42 so that no damage is done either to the auxiliary power system or to the components connected to the DC bus lines. Such monitoring and control of the auxiliary power system operation is carried out both during the exercise cycling of the engine and during power supply operation where power is being provided to the DC bus lines.

As noted above, the auxiliary power system includes a cranking battery 84 and a starter motor 85, to which the output of the cranking battery is supplied during starting. The microprocessor controller 70 monitors the voltage of the cranking battery and provides a warning, as on the display 75, if the cranking battery voltage drops below a predetermined level and starts the engine 60 for a predetermined period of time if the cranking battery voltage drops below a selected level. The alternator battery charger 90 acts as a power supply driven by the engine 60 for providing charging current to the cranking battery during running of the engine 60 to charge the cranking battery 84.

Figure 8:
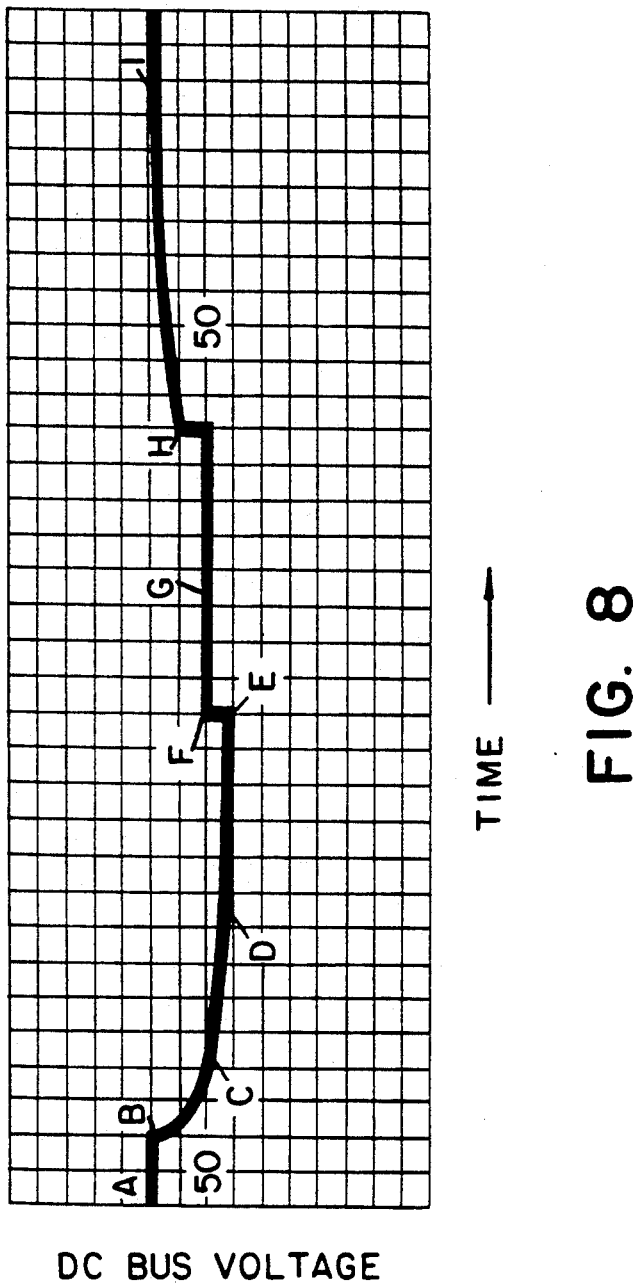
FIG. 8 is a graph showing the voltage across the DC bus lines to an uninterruptible power supply to which the auxiliary power system of the present invention is connected during a typical cycle of power outage.

An exemplary graph of the voltage across the DC bus lines 43 and 44 at the battery 45 during a cycle in which the power from the power grid is interrupted and then restored is shown in FIG. 8. In the section of the graph labeled A the batteries are floating at full charge and the UPS system may be conditioning line power to support the critical load with the power grid functioning normally. At point B the line power fails and the UPS switches to supply power to the critical load from the battery. The battery voltage begins to fall with an exponential decline. However, at this point in time the auxiliary power system 40 is not activated. As the battery voltage continues to fail, it passes a selected point C (e.g., 46 volts on graph of FIG. 8) and the microprocessor 70 provides a control signal to the engine controller 87 to start the engine of the auxiliary power supply. However, at this time the output of the alternator is not provided to the DC bus lines. Thus, the voltage across the DC bus lines continues to decline as shown by the section labeled D in FIG. 8. The time during which the engine is running without power being delivered from the alternator is selected to allow the engine to warm up to the desired operating temperature before it is loaded. This period of time may vary depending on the engine design, but typically will be about 30 seconds. After the warmup interval has elapsed, the microprocessor provides a signal to the alternator control 91 to provide the rectified output of the alternator to the DC bus lines at the time point E, which substantially immediately raises the battery voltage to the point labeled F, e.g., from about 45 volts to about 52.5 volts as shown in FIG. 8. This is a voltage less than the full charge voltage (e.g., 56 volts) of the battery. At this time, DC power is provided from the auxiliary power system 40 to the UPS to be converted to AC power to the load, and further power is provided from the system 40 to the battery to charge the battery to about 80% of its full charge. Because the DC bus voltage is limited to less than the full charge voltage of the battery, the auxiliary power system cannot overcharge the battery.

The auxiliary power system 40 continues to provide power to the UPS as long as necessary, as illustrated by the constant line labeled G in FIG. 8. When the commercial line power returns, the UPS switches from inverter operation and functions only to condition line power for the critical load. The microprocessor senses the drop in current demand on the DC bus lines and disconnects the alternator from the DC bus lines and turns off the engine. The battery charger within the UPS system is activated to supply power from the power grid, as shown at the point H, which raises the voltage on the DC bus lines to the charging voltage. The voltage across the DC bus lines increases in a decreasing exponential fashion, as indicated by the line I in FIG. 8, as the UPS battery charger brings the batteries back up to full charge using power from the power grid.

Figure 9:
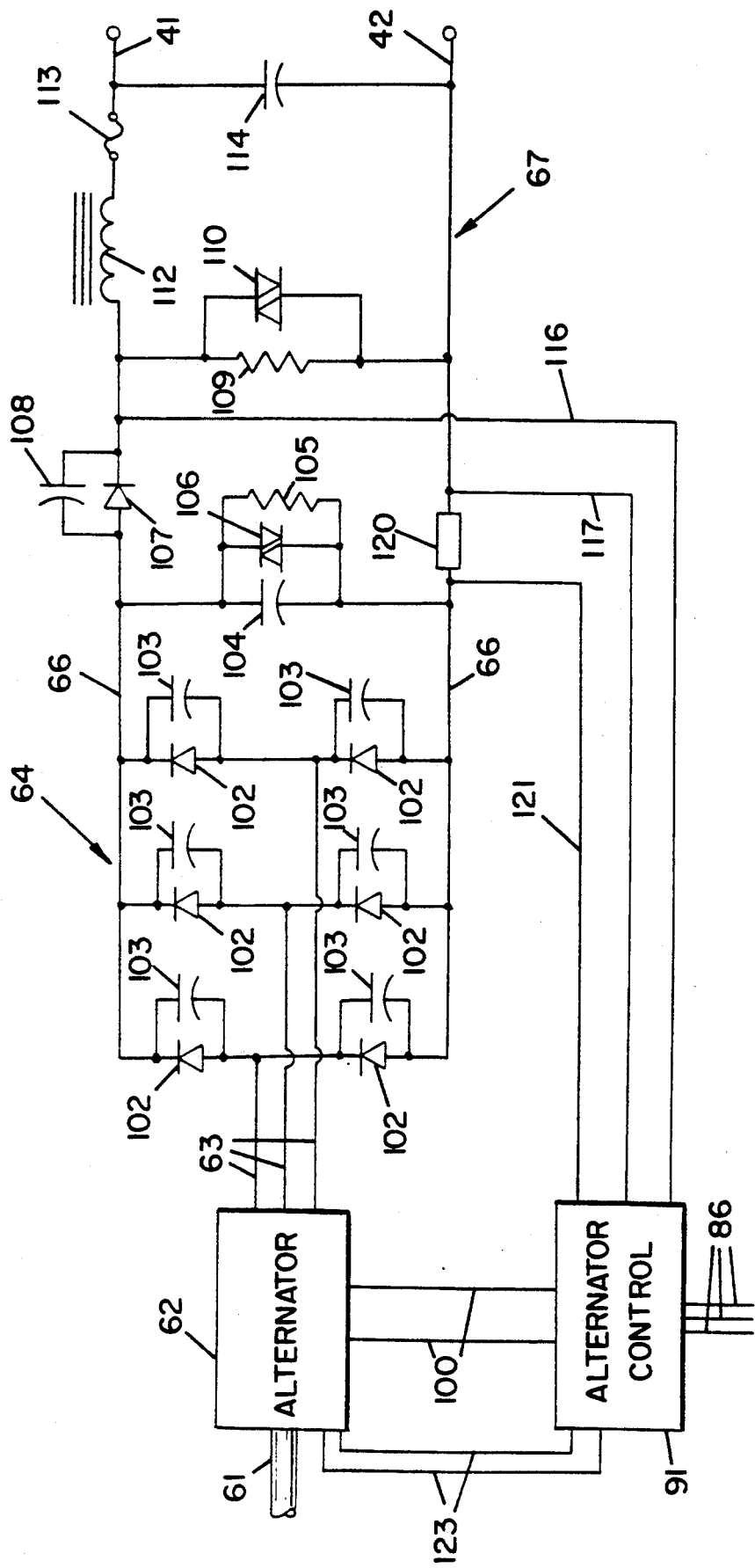
FIG. 9 is a schematic circuit diagram of the alternator control system and rectifier and filter in the auxiliary power supply of the present invention.

A schematic circuit diagram of an exemplary output voltage control circuit for the alternator 62 is shown in FIG. 9. The voltage-current regulator 91 provides control current on lines 100 to the field winding of the alternator 62 to maintain a desired output voltage across the output lines 41 and 42. The polyphase (e.g., three phase) output of the alternator 62 is provided on output lines 63 to the rectifier 64 which is illustratively shown as being composed of a full bridge of rectifying diodes 102 with parallel capacitors 103. The output of the rectifier 64 on the output lines 66 is provided to a filter section 67 as illustratively shown in FIG. 9 as composed of a first parallel combination of a capacitor 104, resistor 105 and varistor 106 connected between the output lines 66, a series connected diode 107 with parallel capacitor 108 to prevent backflow of current into the rectifier from the DC lines 41 and 42, a further resistor 109 and varistor 110 connected across the lines 66, a series filter inductor 112, a fuse 113, and an output filter capacitor 114 connected at the output across the lines 41 and 42.

The large parallel capacitor 104 (e.g., 50,000 microfarads), the output capacitor 114 (e.g., 150 microfarads), and the series inductor 112 serve to substantially filter out the ripples in the output of the bridge 64 as well as filtering out high frequency electromagnetic interference. Current backflow into the large filter capacitor 104 is prevented by the diode 107. Feedback of the output voltage is provided by a line 116, extending from connection to the upper conducting line 66, and a second conducting line 117 connected to the lower conducting line 66 which is electrically connected to the output line 42. To monitor current, a small shunt 120 (e.g., 50 milliohms) is connected in the return line and a further conducting line 121 is connected to the lower line 66 on the opposite side of the shunt 120 from the connection of the line 117. Thus, the voltage between the lines 117 and 121 will be related to the current in the return line. The voltage regulator 91 is conventionally provided with drive current from the alternator 62 on lines 123 and may function in a conventional fashion to control the output voltage and current to desired levels in accordance with preset adjustments of the voltage and current in the regulator in a fashion conventional in power supplies of this type, such as power supplies for arc welding machines. For example, the regulator may be set to provide an output voltage of 52.5 volts from the rectifier where the fully charged voltage of the storage battery 45 is 56 volts. If an overcurrent is detected, the regulator 91 can shut down the alternator by cutting off the current to the field winding. Alternatively, control signals may be provided on the control lines 86 from the microprocessor 70 to provide feedback signals to the voltage-current regulator indicating the desired voltage or current level to be maintained by the system at points in the system other than at the output of the rectifier.

It is understood that the invention is not confined to the particular construction and embodiments illustrated herein, but embraces such modified forms thereof as come within the scope of the following claims.

What is claimed is:

1. A power supply system for a telecommunications system comprising:
   (a) DC bus lines which are connectable to a telecommunications system;
   (b) a storage battery connected across the DC bus lines;
   (c) an internal combustion engine and means for responding to a control signal to start the engine;
   (d) an alternator coupled to the engine to be driven by it and having AC output terminals;
   (e) a rectifier connected to the output terminals of the alternator for rectifying the AC output of the alternator to a DC voltage;
   (f) e means for filtering the DC voltage from the rectifier to provide a filtered DC voltage to the DC bus lines;
   (g) means for controlling the alternator when the engine is running to provide a controlled DC output voltage from the rectifier and the means for filtering to the DC bus lines so that the voltage across the DC bus lines is maintained at a selected voltage level;
   (h) a charger connected to receive power from an AC power system and connected to supply DC power to the DC bus lines when AC power is available from the AC power system;

(i) control means connected to monitor the voltage on the DC bus lines for providing a control signal to turn on the engine when the voltage across the DC bus lines drops belows a predetermined value and for controlling the means for controlling the alternator for activating the alternator to provide the DC output power from the rectifier and filter means to the DC bus lines.

2. The power supply system of claim 1 wherein the voltage across the DC bus lines when the output of the rectifier is connected thereto is maintained at a voltage level below the nominal open circuit voltage level of the battery.

3. The power supply system of claim 1 wherein the control means senses the current drawn from the alternator on the DC bus lines, and wherein the control means turns off the engine when current is not being drawn from the alternator.

4. The power supply system of claim 1 wherein the control means monitors the time elapsed since the last turn-off of the engine and if the time elapsed exceeds a predetermined time interval the control means provides a control signal to start the engine and controls the alternator so that no power is delivered from the alternator to the DC bus lines, and controls the engine to run for a selected period of time to allow the engine to adequately warm up and thereafter shuts off the engine.

5. The power supply system of claim 4 wherein the control means includes means for monitoring engine temperature, oil pressure, and fuel level in a fuel tank which supplies fuel to the engine, wherein the control means stores the values of the sensed parameters in a memory, and provides the values in the memory for interrogation by an operator and provides an alarm to an operator if a parameter falls outside a predetermined limit for the value of the parameter.

6. The power supply system of claim 1 wherein the control means includes means for monitoring the filtered DC voltage output of the rectifier and filter means while the engine is running and for providing a warning signal to an operator if the output voltage is above or below predetermined limits.

7. The power supply system of claim 1 wherein the engine includes a cranking battery and a starter motor to which the output of the cranking battery is supplied during starting, and the control means includes means for monitoring the voltage of the cranking battery and wherein the control means provides a warning if the cranking battery voltage drops below a predetermined level and starts the engine for a predetermined period of time if the cranking battery voltage drops below a selected level, and wherein the system further includes power supply means driven by the engine for providing charging current to the cranking battery during running of the engine to charge the cranking battery.

8. The power supply system of claim 1 wherein the control means controls the means for controlling the alternator so as not to supply power to the DC bus lines for a selected period of time after the engine has started to allow the engine to warm up, and for then activating the alternator to provide the DC power from the rectifier and the filter means to the DC bus lines.

9. The power supply system of claim 1 wherein the control means includes a microprocessor, an analog to digital converter connected to the DC bus lines to receive the DC voltage at the battery and providing digital data corresponding to the DC voltage to the microprocessor, the microprocessor providing control signals to the means for controlling the alternator to maintain the DC voltage at the battery at a chosen level.

* * * * *

UNITED STATES PATENT AND TRADEMARK OFFICE
CERTIFICATE OF CORRECTION

PATENT NO. : 5,332,927
DATED : July 26, 1994
INVENTOR(S) : Steven Paul, et. al.

It is certified that error appears in the above-indentified patent and that said Letters Patent is hereby corrected as shown below:

Column 14, line 56, "(f) e means" should be --(f) means--.

Signed and Sealed this

Twenty-eight Day of March, 1995

Attest:

BRUCE LEHMAN

Attesting Officer

Commissioner of Patents and Trademarks